US005909955A

United States Patent [19]

Roorda

[11] Patent Number: 5,909,955

[45] Date of Patent: Jun. 8, 1999

[54] PUCK STYLE UNDER CABINET LIGHT FIXTURE WITH IMPROVED MOUNTING RING

[75] Inventor: John W. Roorda, La Jolla, Calif.

[73] Assignee: Westek Associates, San Diego, Calif.

[21] Appl. No.: 08/814,607

[22] Filed: Mar. 10, 1997

[51] Int. Cl.[6] .............................. B60Q 1/00; B60Q 3/00; F21S 1/06; F21S 3/06

[52] U.S. Cl. .......................... 362/368; 362/364; 362/362; 362/133; 362/373

[58] Field of Search .................................... 362/368, 133, 362/549, 362, 364, 365, 373, 147, 374, 375, 33, 294, 310, 404

[56] References Cited

U.S. PATENT DOCUMENTS

| | | | |
|---|---|---|---|
| 4,862,334 | 8/1989 | Ivey et al. | 362/149 |
| 5,426,572 | 6/1995 | Weinstock et al. | 362/133 |
| 5,567,041 | 10/1996 | Slocum | 362/148 |

*Primary Examiner*—Sandra O'Shea
*Assistant Examiner*—Michael J. Smith
*Attorney, Agent, or Firm*—Brown, Martin, Haller & McClain

[57] ABSTRACT

A light fixture comprises a lamp assembly, a cylindrical housing surrounding and supporting the lamp assembly, and a cylindrical mounting ring surrounding and supporting the cylindrical housing. The mounting ring includes an upper edge with a plurality of circumferentially spaced projections for engaging a support surface to define a plurality of airflow gaps. The mounting ring also has a pair of radially inwardly directed mounting tabs extending from the upper edge of the mounting ring for receiving fastener screws.

19 Claims, 2 Drawing Sheets

PUCK STYLE UNDER CABINET LIGHT FIXTURE WITH IMPROVED MOUNTING RING

BACKGROUND OF THE INVENTION

The present invention relates generally to light fixtures, and more particularly, to an annular under cabinet halogen light fixture configured with improved mounting capabilities.

In recent years, low wattage accent lighting has become popular in home decorating. In one form of this accent lighting, strings of low voltage incandescent lights have been mounted beneath kitchen cabinets. More recently, low profile light fixtures incorporating small halogen lamps have become popular. See for example U.S. Pat. No. 5,426,572 granted Jun. 20, 1995 to Steven P. Weinstock, et al. Such light fixtures can generate high temperatures.

In many jurisdictions the local government mandates that electrical installations meet certain codes, such as the National Electrical Code (NEC). They also require that light fixtures and the way they are mounted not exceed specified temperatures in order to ensure against fires.

The present invention is directed to solving the problem of providing an annular halogen light fixture that can be easily and conveniently mounted to the underside of a wooden cabinet.

SUMMARY OF THE INVENTION

In accordance with my invention, a light fixture comprises a lamp assembly, a cylindrical housing surrounding and supporting the lamp assembly, and a cylindrical mounting ring surrounding and supporting the cylindrical housing. The mounting ring has a pair of radially inwardly directed mounting tabs for receiving fastener screws.

DETAILED DESCRIPTION OF THE PREFERRED EMBODIMENT

Figure 1:
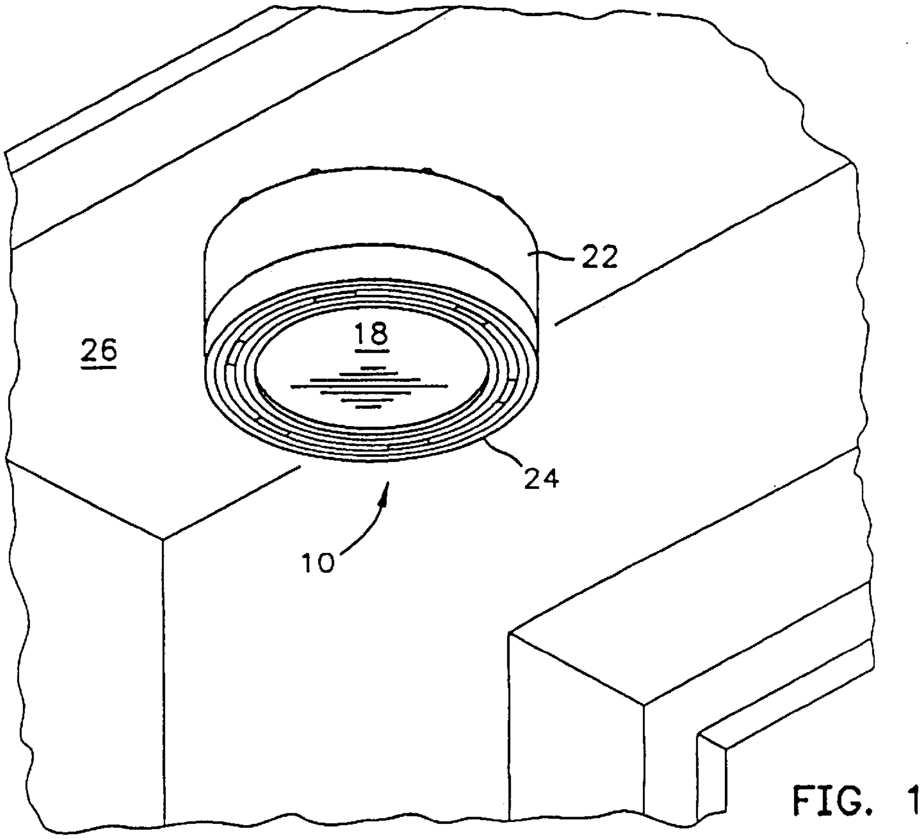
FIG. 1 is a perspective view of a puck style light fixture embodying the present invention mounted to the underside of a cabinet next to a window.
Figure 5:
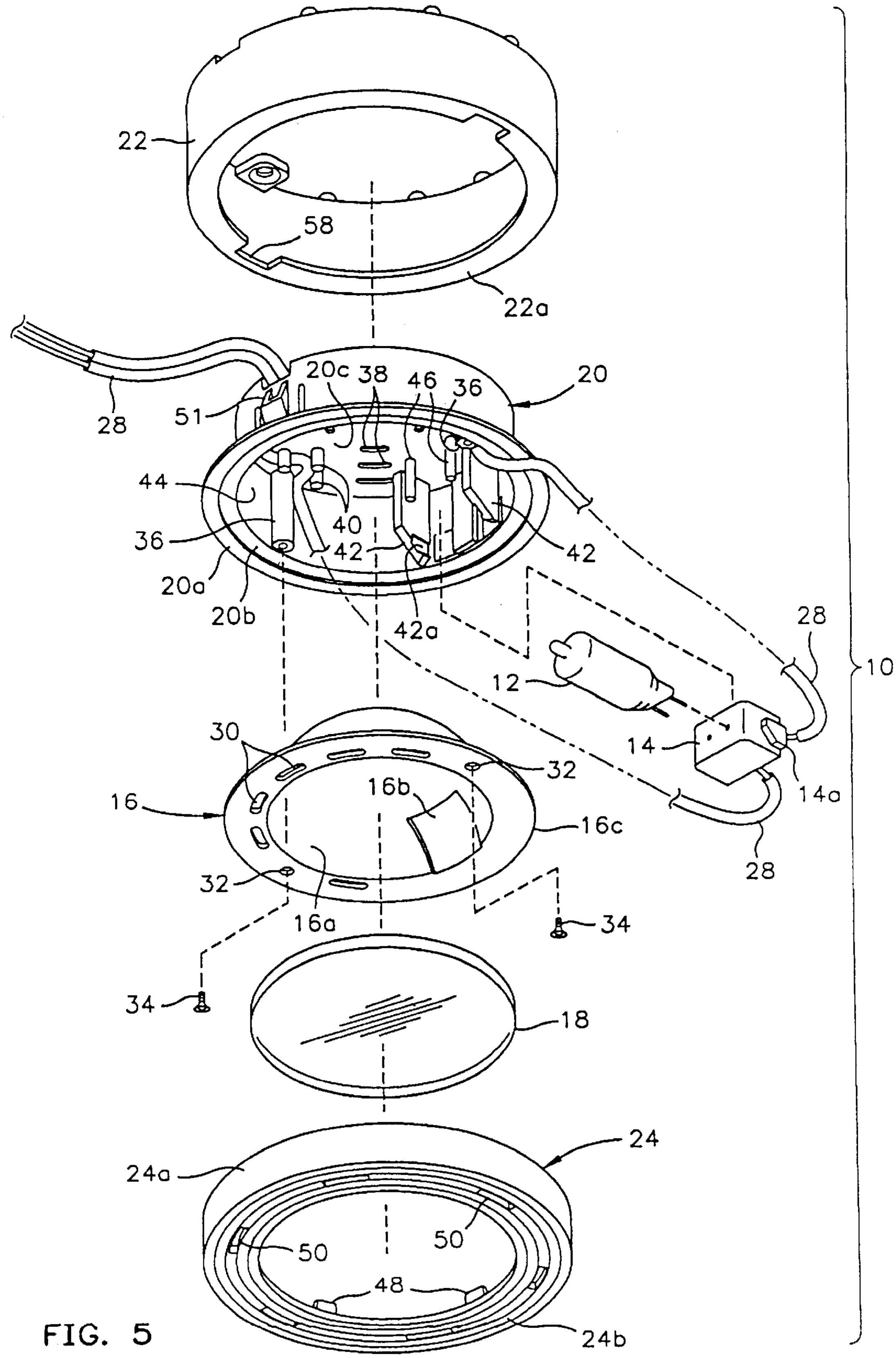
FIG. 5 is an exploded perspective view of the light fixture of FIG. 1.

In accordance with my invention a light fixture 10 (FIGS. 1 and 5) includes a lamp assembly having a halogen bulb 12, a socket 14 for receiving and supporting the bulb 12, a reflector 16 surrounding the bulb 12, and a frosted glass lens 18 extending across the reflector 16. A cylindrical housing 20 surrounds and supports the lamp assembly. A cylindrical mounting ring 22 surrounds and supports the cylindrical housing 20. A decorative facing ring 24 is connected to a lower end of the cylindrical housing 20. The light fixture 10 is designed to be secured to the underside 26 (FIG. 1) of a kitchen cabinet to illuminate the countertop (not visible) beneath the same. Wires 28 (FIG. 5) connect the socket 14 to a source of one hundred and twenty volt AC power (not illustrated). The wires 28 can be drawn through a hole in the underside of the cabinet concealed by the light fixture 10 so they will be hidden from view as illustrated in FIG. 1.

The reflector 16 (FIG. 5) has a bowl-shaped curved portion **16*a* for concentrating and directing the illumination from the halogen bulb 12. The curved portion 16*a* has a rectangular aperture 16*b* through which the socket 14 extends to place the bulb 12 in the center of the reflector 16. The reflector 16 has an annular lip 16*c* with a plurality of elongate vent holes 30. The lip 16*c* is also formed with a pair of diametrically positioned holes 32 for receiving screws 34 that secure the reflector to the cylindrical housing 20 as hereafter described. The reflector 16** may be integrally molded as a single piece of heat-resistant plastic with a reflective coating applied or molded thereto as is well known in the art.

The cylindrical housing 20 is formed with a stepped annular lip including a radially outer portion **20*a* and a radially inner portion 20*b*. The annular lip 16*c* of the reflector 16 is dimensioned so that it lies on top of the radially inner portion 20*b* of the annular lip of the cylindrical housing 20, inside the radially outer portion 20*a*. Cylindrical posts 36 formed on the inside wall of the cylindrical housing 20 at diametrically spaced positions and have holes for threadably receiving the screws 34 that secure the reflector 16 in position. The vent holes 30 in the annular lip 16*c* of the reflector 16 are spaced inwardly from the radially inner portion 20*b* of the annular lip of the cylindrical housing 20. Air heated by the halogen bulb 12 can thus escape through the vent holes 30**.

The upper wall **20*c* (FIG. 5) of the cylindrical housing 20 is formed with a plurality of vent holes 38 to permit additional airflow within the light fixture adjacent the lamp assembly to facilitate cooling. Guide posts 40 extend upwardly from the upper wall 20*c* to hold the wires 28 in position. Radial fins 42 extend from the inside side wall 44 of the cylindrical housing 20. The fins 42 are formed with slots 42*a* that mate with projections 14*a* on the sides of the socket 14 for holding the socket in position between the fins 42. The front of the socket 14 engages the lower ends of posts 46 that extend downwardly from the upper wall 20*c* of the cylindrical housing 20. Beveled tabs 51 are formed on the side wall 44 for deflecting inwardly when the cylindrical housing 20 is inserted into the mounting ring 22. The tabs 51 spring back to engage the underside of an inwardly extending lower annular flange 22*a* to removably secure the cylindrical housing 20 to the mounting ring 22. The cylindrical housing 20** is preferably molded as a single unitary piece of high temperature resistant plastic.

The decorative facing ring 24 has an annular side wall **24*a* that snaps around the outer edge of the annular lip 16*c* of the reflector 16 and the outer portion 20*a* of the annular lip of the cylindrical housing 20. A plurality of upwardly extending spacer elements 48 project from the ribbed portion 24*b* of the facing ring 24. The ends of the spacer elements 48 engage the annular lip 16*c* of the reflector. The spacer elements 48 also retain the lens 18 in position. Preferably the decorative facing ring 24** is made of injection molded high temperature resistant plastic with a chrome finish or coating.

Figure 2:
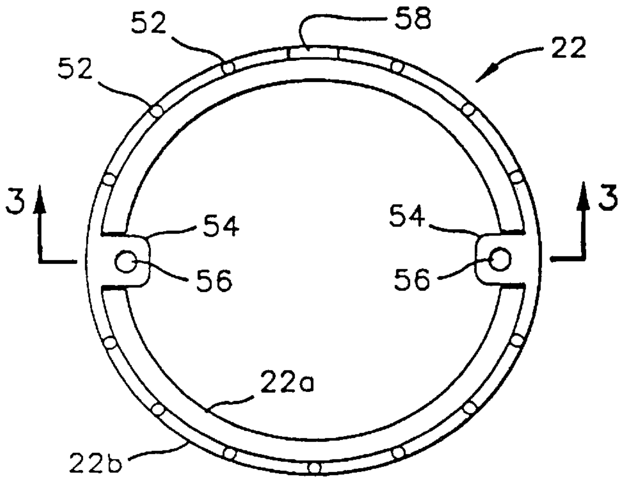
FIG. 2 is an enlarged top plan view of the mounting ring of the light fixture of FIG. 1.
Figure 4:
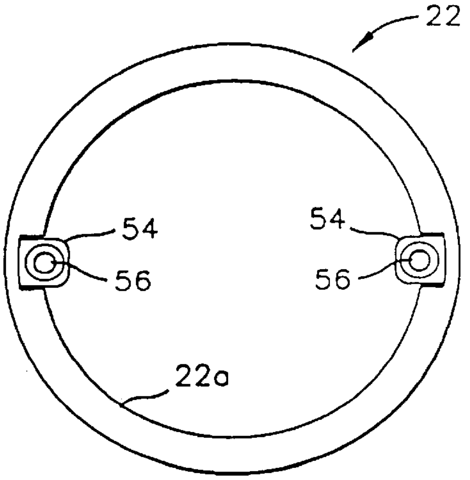
FIG. 4 is an enlarged bottom plan view of the mounting ring of the light fixture of FIG. 1.
Figure 3:
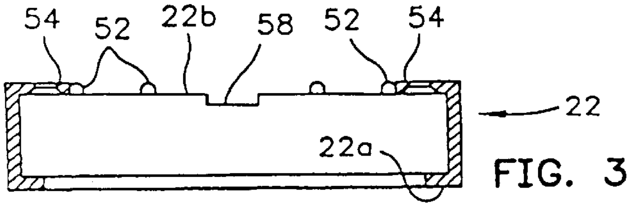
FIG. 3 is an enlarged vertical sectional view of the mounting ring of the light fixture of FIG. 1 taken along line 3—3 of FIG. 2.

Details of the cylindrical mounting ring 22 are illustrated in FIGS. 2–4. The cylindrical mounting ring 22 includes the lower annular flange **22*a* and an upper edge 22*b* with a plurality of equally circumferentially spaced hemispherical projections or bumps 52. The bumps 52 engage a support surface such as the underside 26 of the kitchen cabinet (FIG. 1) to define a plurality of airflow gaps therebetween. The mounting ring 22 has a pair of radially inwardly directed mounting tabs 54 for with holes 56. The holes 56 receive fastener screws (not illustrated) for holding the light fixture 10 to the underside 26 of the kitchen cabinet, with the screws being concealed from view. The upper edge 22***b* of the mounting ring 22 has a rectangular recess 58 formed therein. The recess 58 can receive the wires 28 (FIG. 5) when they are not directed through a hole in the underside 26 of the kitchen cabinet.

The light fixture 10 can be mounted in recession fashion in a circular hole (not illustrated) in the underside 26 of the cabinet. In such a case, the mounting ring 22 is not used and the hole is sized so that the beveled tabs 51 deflect inwardly and then outwardly to hold the housing 20 in place.

While I have described a preferred embodiment of my puck style under cabinet halogen light fixture, it will be understood by those skilled in the art that my invention may be modified in both arrangement and detail. For example, the mounting ring could be formed with a plurality of slots in the sidewall portion thereof for allowing further escape of heated air to enhance cooling. Therefore, the protection afforded my invention should only be limited in accordance with the scope of the following claims.

I claim:

1. A light fixture, comprising:

a lamp assembly;

a cylindrical housing surrounding and supporting the lamp assembly; and a cylindrical mounting ring surrounding and supporting the cylindrical housing, the mounting ring having a pair of radially inwardly directed mounting tabs for receiving fastener screws, said mounting ring having an upper edge with a plurality of circumferentially spaced projections for engaging a support surface to define a plurality of airflow gaps.

2. A light fixture according to claim 1 wherein each projection comprises a bump.

3. A light fixture according to claim 2 wherein each bump has a hemispherical shape.

4. A light fixture according to claim 1 wherein the lamp assembly includes a bulb, a socket for receiving and supporting the bulb, a reflector surrounding the bulb, and a lens extending across the reflector.

5. A light fixture according to claim 1 wherein the mounting ring has a lower edge with an inwardly directed circumferential flange.

6. A light fixture according to claim 1 wherein the cylindrical housing has retention means for removably securing the housing to the mounting ring.

7. A light fixture according to claim 1 and further comprising a decorative facing ring connected to a lower end of the cylindrical housing.

8. A light fixture according to claim 1 wherein the cylindrical housing and mounting ring are made of plastic.

9. A light fixture according to claim 1 wherein the upper edge of the mounting ring has a wire receiving recess formed therein.

10. A light fixture, comprising:

a lamp assembly;

a cylindrical housing surrounding and supporting the lamp assembly including retention means for securing the housing in a hole in the underside of a cabinet; and a cylindrical mounting ring surrounding and supporting the cylindrical housing and removably secured to the housing by the retention means, the mounting ring including a pair of radially inwardly directed mounting tabs for receiving fastener screws.

11. A light fixture according to claim 10 wherein the mounting ring has an upper edge with a plurality of circumferentially spaced projections for engaging a support surface to define a plurality of airflow gaps.

12. A light fixture according to claim 11 wherein each projection comprises a bump.

13. A light fixture according to claim 12 wherein each bump has a hemispherical shape.

14. A light fixture according to claim 10 wherein the lamp assembly includes a bulb, a socket for receiving and supporting the bulb, a reflector surrounding the bulb, and a lens extending across the reflector.

15. A light fixture according to claim 10 wherein the mounting ring has a lower edge with an inwardly directed circumferential flange.

16. A light fixture according to claim 10 wherein the retention means for removably securing the housing to the mounting ring comprises a pair of resilient tabs that deflect and spring back to an original position.

17. A light fixture according to claim 10 and further comprising a decorative facing ring connected to a lower end of the cylindrical housing.

18. A light fixture according to claim 10 wherein the upper edge of the mounting ring has a wire receiving recess formed therein.

19. A light fixture, comprising:

a lamp assembly including a bulb, a socket for receiving and supporting the bulb, a reflector surrounding the bulb, and a lens extending across the reflector;

a cylindrical mounting ring including an upper edge with a plurality of circumferentially spaced projections for engaging a support surface to define a plurality of airflow gaps, a lower edge with an inwardly directed circumferential flange, and a pair of radially inwardly directed mounting tabs extending from the upper edge for receiving fastener screws; and a cylindrical housing surrounding and supporting the lamp assembly and dimensioned to be concentrically received in, and supported by, the mounting ring, the housing including retention means in the form of deflectable tabs for engaging the circumferential flange of the mounting ring to removably secure the housing to the mounting ring.

* * * * *